United States Patent
Seidel et al.

(10) Patent No.: US 12,195,623 B2
(45) Date of Patent: Jan. 14, 2025

(54) COMPOSITION AND METHOD FOR PRODUCING A TRANSPARENT THERMOPLASTIC POLYCARBONATE/POLYMETHYL METHACRYLATE MOULDING COMPOUND

(71) Applicant: Covestro Deutschland AG, Leverkusen (DE)

(72) Inventors: Andreas Seidel, Dormagen (DE); Tobias Bubmann, Bayreuth (DE); Jan Heijl, Lokeren (BE); Marina Reithmeier, Cologne (DE); Volker Altstädt, Hamburg (DE)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 18/575,903

(22) PCT Filed: Jun. 27, 2022

(86) PCT No.: PCT/EP2022/067474
§ 371 (c)(1),
(2) Date: Jan. 2, 2024

(87) PCT Pub. No.: WO2023/280608
PCT Pub. Date: Jan. 12, 2023

(65) Prior Publication Data
US 2024/0270961 A1    Aug. 15, 2024

(30) Foreign Application Priority Data
Jul. 5, 2021 (EP) ................................ 21183774

(51) Int. Cl.
| | |
|---|---|
| C08L 69/00 | (2006.01) |
| B29C 45/00 | (2006.01) |
| B29K 69/00 | (2006.01) |
| C08G 81/02 | (2006.01) |

(52) U.S. Cl.
CPC ........ C08L 69/005 (2013.01); B29C 45/0001 (2013.01); C08G 81/027 (2013.01); B29K 2069/00 (2013.01); B29K 2995/0026 (2013.01); C08L 2201/10 (2013.01); C08L 2205/02 (2013.01)

(58) Field of Classification Search
CPC ..... C08G 64/06; B29C 48/022; C08F 220/14; C08F 220/325; C08K 5/098; B29K 2033/12; B29K 2069/00
See application file for complete search history.

(56) References Cited

U.S. PATENT DOCUMENTS

| | | |
|---|---|---|
| 3,553,167 A | 1/1971 | Schnell et al. |
| 4,075,173 A | 2/1978 | Maruyama et al. |
| 4,269,964 A | 5/1981 | Freitag et al. |
| 4,311,823 A | 1/1982 | Imai et al. |

(Continued)

FOREIGN PATENT DOCUMENTS

| | | |
|---|---|---|
| DE | 2232877 A1 | 1/1974 |
| DE | 2714544 A1 | 10/1977 |

(Continued)

OTHER PUBLICATIONS

A.K. Singh, et al. "Reactive Compatibilization of Polycarbonate and Poly(methyl)methacrylate in the Presence of a Novel Transesterification Catalyst SnCl2.2H2O", J. Phys. Chem. B 2011, 115, 1601-1607.
A.K. Singh, et al. "Evidence for in situ graft copolymer formation and compatibilization of PC and PMMA during reactive extrusion processing in the presence of the novel organometallic transesterification catalyst tin(II) 2-ethylhexanoate", RSC Advances, 2012, 2, 10316-10323.
T. Bubmann et al. "Transparent PC/PMMA Blends Via Reactive Compatibilization in a Twin-Screw Extruder" Polymers 2019, 11, 2070.
International Search Report, PCT/EP2022/067474, date of mailing: Jul. 13, 2022, Authorized officer: Michael Hoffmann.

*Primary Examiner* — Robert D Harlan
(74) *Attorney, Agent, or Firm* — John E. Mrozinski, Jr.

(57) ABSTRACT

The present invention relates to a composition for producing a thermoplastic moulding compound containing: A) an aromatic polycarbonate and/or aromatic polyester carbonate containing carboxy groups, wherein the polycarbonate has an acid value ranging from 0.5 to 10 mg of potassium hydroxide/g, determined in dichloromethane/ethanol as the solvent by means of potentiometric titration in accordance with DIN EN ISO 2114, method A in version 2002-06 with ethanolic potassium hydroxide solution at ambient temperature, and a weight-average molecular mass ($M_w$), determined by gel permeation chromatography at ambient temperature in dichloromethane as the solvent using a BPA polycarbonate standard, ranging from 15,000 to 40,000 g/mol, and B) a polymethyl methacrylate copolymer containing structural units derived from glycidyl methacrylate, wherein the copolymer has an epoxide equivalent weight, determined in dichloromethane as the solvent at ambient temperature in accordance with DIN EN 1877-1 in version 2000-12, of 0.05 to 3 wt % and a weight-average molecular mass ($M_w$), determined by gel permeation chromatography at ambient temperature in tetrahydrofuran as the solvent using a polystyrene standard, of 20,000 to 200,000 g/mol, wherein the weight ratio of component A and component B ranges from 95:5 to 35:65, and a method for producing a moulding compound from the composition, a moulding compound obtained according to the method, the use of the moulding compound to produce moulds, the moulds per se and a method for producing the moulds.

17 Claims, No Drawings

(56) References Cited

U.S. PATENT DOCUMENTS

| | | | |
|---|---|---|---|
| 4,334,053 A | 6/1982 | Freitag et al. | |
| 4,853,458 A | 8/1989 | Gambale et al. | |
| 4,959,411 A | 9/1990 | Gambale et al. | |
| 2013/0310524 A1 * | 11/2013 | Markanday | C08F 293/005 525/418 |
| 2022/0145073 A1 | 5/2022 | Seidel et al. | |

FOREIGN PATENT DOCUMENTS

| | | | |
|---|---|---|---|
| DE | 3007934 A1 | 9/1981 | |
| DE | 3832396 A1 | 2/1990 | |
| WO | 2016138246 A1 | 9/2016 | |
| WO | WO-2016189494 A1 * | 12/2016 | C08G 64/14 |

* cited by examiner

COMPOSITION AND METHOD FOR PRODUCING A TRANSPARENT THERMOPLASTIC POLYCARBONATE/POLYMETHYL METHACRYLATE MOULDING COMPOUND

CROSS REFERENCE TO RELATED APPLICATIONS

This application is a national stage application under 35 U.S.C. § 371 of PCT/EP2022/067474, filed Jun. 27, 2022, which claims benefit of EP application Ser. No. 21/183,774.5, filed Jul. 5, 2021, both of which are incorporated herein by reference in their entireties.

FIELD OF THE INVENTION

The present invention relates to a polycarbonate/polymethyl methacrylate composition for producing a thermoplastic polycarbonate/polymethyl methacrylate molding compound, to a process for producing the molding compound, to the molding compound itself, to the use of the molding compound for producing molded articles, to the molding articles containing such a molding compound and to a process for producing molded articles.

BACKGROUND OF THE INVENTION

Driven not least by the development of LED light source technology and the resulting novel concepts for illumination and function integration, transparent and translucent thermoplastic molding compounds suitable for producing molded articles transilluminable by visible light have become increasingly important in recent years in many fields of application, for example in the automotive sector, in the building sector and in the electronics sector.

The profile of properties of traditional transparent thermoplastic polymer materials such as polycarbonate (PC) and polymethyl methacrylate (PMMA) is increasingly reaching its limits in the case of many of these novel applications. For example, in the case of transilluminable components in automobile interiors, for example instrument panel carriers or decorative trim pieces, or in automotive body applications intended to serve for example for ambient lighting or appropriately switchable functional display functions, there is often a need for a material ductility that is improved over PMMA and for a scratch resistance or chemicals resistance that is improved over PC. It is accordingly obvious for a person skilled in the art to make use of polymer blend technology to combine with one another the individual advantages of these two materials (high scratch resistance and good chemicals resistance of PMMA on the one hand and high ductility of PC on the other hand).

The properties of such PC/PMMA molding compounds and the molded articles produced therefrom may be varied over wide ranges and adapted to the requirements of the respective application through suitable choice of their composition and production conditions. This makes it possible to produce molding compounds having a very wide variety of property profiles which are essentially often between those of pure PC and those of pure PMMA.

However, this does not in principle apply to light transmittance (transparency). Since PC and PMMA melts are not completely miscible, the compounding of PC/PMMA blends generally results in biphasic morphologies in which the polymer used in excess forms the matrix phase in which the respective other polymer is relatively finely divided and thus exhibits a multiplicity of microscopic phase interfaces. Incident light is scattered at these PC-PMMA phase interfaces due to the different refractive indices of the two polymers. The result is a high opacity (i.e. very low light transmittance) of the PC/PMMA blends compared to the two polymeric blend partners.

The phase interfaces may also be weak points in respect of mechanical stresses. These phase interfaces may for example result in brittle fracture failure in the event of (multiaxial) impacts and/or in fracture failure in the event of external stresses on the molded article, in particular when the molded article is in contact with certain chemicals/media such as for example fats or oils which are constituents of foodstuffs, lubricants or cosmetic products (for example hand cream or sun cream).

A hitherto insufficiently solved technical challenge in materials development was thus that of providing PC/PMMA blends which are suitable via a thermoplastic molding process for producing transparent or translucent (i.e. transilluminable) molded articles and exhibit an advantageous combination of scratch resistance, ductility and stress cracking resistance under the influence of chemicals.

Various scientific publications and patent documents disclose that transparent PC/PMMA blends are preparable via block copolymers that may be formed in situ in a reactive extrusion.

WO 2020/212229 A1 discloses a reactive compounding process for producing a thermoplastic molding compound using aromatic polycarbonate and a further polymer which contains at least one type of functional groups selected from ester, epoxy, hydroxy, carboxyl and carboxylic anhydride groups, wherein the catalyst employed is a special phosphonium salt. The application especially also discloses the production of transparent thermoplastic PC/PMMA molding compounds in such a process.

WO 2016/138246 A1 discloses transparent PC/PMMA blends containing 9.9% to 40% by weight of polycarbonate and 59.9% to 90% by weight of PMMA which are produced in a melt extrusion using 0.0025% to 0.1% by weight of a tin catalyst.

WO 2016/189494 A1 discloses transparent PC/PMMA blends containing 80% to 95% by weight of a specially specified branched polycarbonate having an end cap content of 45% to 80% and 4.9% to 20% by weight of PMMA which are produced in a melt extrusion by transesterification using 0.1% to 1.5% by weight of a catalyst, preferably selected from Zn, Sn and Ag compounds.

A. K. Singh, et al. "Reactive Compatibilization of Polycarbonate and Poly(methyl)methacrylate in the Presence of a Novel Transesterification Catalyst $SnCl_2 \cdot 2H_2O$", J. Phys. Chem. B 2011, 115, 1601-1607 discloses transparent PC/PMMA molding compounds produced in a reactive extrusion process using $SnCl_2 \cdot 2H_2O$ as catalyst.

A. K. Singh, et al. "Evidence for in situ graft copolymer formation and compatibilization of PC and PMMA during reactive extrusion processing in the presence of the novel organometallic transesterification catalyst tin(II) 2-ethylhexanoate", RSC Advances, 2012, 2, 10316-10323 discloses translucent PC/PMMA molding compounds produced in a reactive extrusion process using tin(II) 2-ethylhexanoate as catalyst.

T. Bubmann et al. "Transparent PC/PMMA Blends Via Reactive Compatibilization in a Twin-Screw Extruder" Polymers 2019, 11, 2070 discloses that, as a result of an interpolymeric transesterification reaction and thus formation of PC-g-PMMA graft polymers during the reactive extrusion, such PC+PMMA molding compounds produced in reactive extrusion processes according to the previously cited prior art are indeed transparent but exhibit insufficient material ductility for any industrial application. Proposed as a reason therefor is the molecular weight reduction of the polycarbonate accompanying the transesterification which also contributes decisively to the transparency in the blends thus produced since the miscibility of PC and PMMA improves with decreasing PC molecular weight, thus resulting in monophasic phase morphologies in the blends produced by reactive extrusion.

For a number of applications the PC/PMMA blends of the prior art exhibit a light transmittance that is still insufficient and/or a light transmittance that is insufficiently constant over the entire wavelength range of the visible light.

U.S. Pat. No. 4,959,411 discloses a process for producing a block copolymer by reaction in organic solution or in a melt compounding of an epoxy-functionalized olefin polymer with a carboxy-functionalized polycarbonate and to the use of such a copolymer for compatibilizing polymer blends of polycarbonate and polyolefin with the objective of reducing their tendency to delamination. The production of copolymers of polycarbonate and polymethyl methacrylate and transparent PC/PMMA molding compounds having the desired profile of mechanical properties is not disclosed.

DETAILED DESCRIPTION OF THE INVENTION

It was therefore desirable to provide a composition for producing a transparent or translucent (i.e. transilluminable with light in the visible wavelength range) thermoplastic polymethyl methacrylate-containing polycarbonate molding compound having improved light transmittance, preferably having a light transmittance that is largely constant over the entire wavelength range of visible light, wherein the molding compound makes it possible to produce transilluminable molded articles which have a scratch resistance improved relative to polycarbonate and are suitable for producing components for use in particular in light guide and illumination applications.

It was further desirable for these compositions to have a stress cracking resistance under the influence of chemicals which is improved over PC/PMMA molding compounds of the prior art, ideally also over pure polycarbonate.

It was further desirable for these compositions to exhibit a good ductility, preferably a ductility improved over transilluminable PC/PMMA molding compounds of the prior art.

It was further desirable to provide a process suitable for producing such molding compounds and preferably in commercially available and industrially established compounding apparatuses such as for example single-screw extruders, co-rotating or counter-rotating twin-screw extruders, planetary roller extruders, internal kneaders or co-kneaders.

It was further desirable to provide a simple process for producing PC/PMMA molded articles having the described profile of properties.

In the context of the present application a transilluminable molded article is to be understood as meaning a molded article which at at least one site has a transmittance Y(D65, 10°) measured and calculated according to DIN 5033-7, version 2014-10 or according to DIN EN ISO 11664-3, version 2013-08 of at least 35%, preferably at least 50%, more preferably at least 65%, most preferably at least 75%.

A preferably transilluminable molded article having a transmittance that is largely constant over the entire wavelength range of visible light is in the context of the present invention to be understood as meaning a molded article for which at at least one site the magnitude of the difference between the local wavelength-specific total transmittances measured at wavelengths of 700 nm ($T_{700}$) and 400 nm ($T_{400}$) is not more than 70%, preferably not more than 50%, particularly preferably not more than 30%, of the value of the local transmittance Y(D65, 10°).

The corresponding wavelength-dependent total transmittances are determined according to DIN 5033-7, version 2014-10. The value Y(D65, 10°) is calculated therefrom according to DIN EN ISO 11664-3, version 2013-08, with light type D65 and the 10° observer. This value Y(D65, 10°) will hereinbelow be referred to as "transmittance".

The transilluminable molded articles produced from the molding compound shall exhibit a scratch resistance, assessed in terms of pencil hardness and determined based on the Wolff-Wilborn method, which is improved over pure polycarbonate. Pure polycarbonate exhibits a pencil hardness of F in this test method, and accordingly the molded articles according to the invention shall have a pencil hardness of at least H, preferably of at least 2H, particularly preferably of at least 3H.

The molded articles produced shall preferably have a scratch resistance that is improved compared to pure polycarbonate and a resistance to fats and oils and/or compositions containing fats and oils such as for example cosmetics, hand creams and sun cream that is improved over pure polycarbonate and/or PC/PMMA compositions of the prior art.

It has surprisingly been found that the desired properties are exhibited by thermoplastic molding compounds obtained by melt compounding a composition containing A) a carboxy-containing aromatic polycarbonate and/or aromatic polyester carbonate, wherein the polycarbonate has an acid number in the range from 0.5 to 10 mg potassium hydroxide (KOH)/g, determined in dichloromethane (DCM)/ethanol as solvent by potentiometric titration according to DIN EN ISO 2114, method A, version 2002-6, with ethanolic KOH solution at room temperature, and a weight-average molecular weight $M_w$, determined by gel permeation chromatography at room temperature in dichloromethane as solvent using a BPA polycarbonate standard, in the range from 10 000 to 40 000 g/mol and B) a polymethyl methacrylate copolymer containing structural units derived from glycidyl methacrylate, wherein the copolymer has an epoxy equivalent, determined in dichloromethane as solvent at room temperature according to DIN EN 1877-1, version 2000-12, of 0.05% to 3% by weight and a weight-average molecular weight $M_w$, determined by gel permeation chromatography at room temperature in tetrahydrofuran as solvent using a polystyrene standard, of 20 000 to 200 000 g/mol, wherein the weight ratio of components A to component B is in the range from 95:5 to 35:65.

In the context of the present application the terms "carboxy" and "carboxyl" are used synonymously and represent COOH groups.

In a preferred embodiment the nature and amounts of the components A and B are chosen such that the ratio of (i) the product of the acid number of component A (in mg KOH/g) and the weight fraction of component A, based on in total 100 parts by weight of the components A and B, to (ii) the product of the epoxy equivalent of component B (in % by weight) and the weight fraction of component B, based on in total 100 parts by weight of the components A and B, is at least 15, more preferably at least 20, particularly preferably at least 25 and most preferably at least 30.

The ratio of (i) the product of the acid number of component A (in mg KOH/g) and the weight fraction of component A, based on in total 100 parts by weight of the components A and B, to (ii) the product of the epoxy equivalent of component B (in % by weight) and the weight fraction of component B, based on in total 100 parts by weight of the components A and B, is preferably not more than 200, particularly preferably not more than 100 and most preferably not more than 50.

The ratio of (i) the product of the acid number of component A (in mg KOH/g) and the weight fraction of component A, based on in total 100 parts by weight of the components A and B, to (ii) the product of the epoxy equivalent of component B (in % by weight) and the weight fraction of component B, based on in total 100 parts by weight of the components A and B, is preferably in the range from 15 to 200, particularly preferably in the range from 20 to 100, more preferably in the range 25 to 100 and most preferably in the range from 25 to 50.

In the melt compounding at least a portion of component A and at least a portion of component B are covalently coupled to one another in a chemical reaction to form a copolymer containing blocks of the components A and B.

In a preferred embodiment the weight ratio of the components A and B is in the range from 90:10 to 60:40, particularly preferably in the range from 85:15 to 75:25.

In a preferred embodiment the compositions contain the components A and B in total in an amount of at least 75% by weight, more preferably of at least 90% by weight, particularly preferably of at least 95% by weight and most preferably of at least 99% by weight.

Preference is further given to compositions consisting of components A and B. In a further preferred embodiment such compositions consist of 35% to 95% by weight, more preferably 60% to 90% by weight, most preferably 75% to 85% by weight, of component A and 5% to 65% by weight, more preferably 10% to 40% by weight, most preferably 25% to 30% by weight, of component B.

In addition to the components A and B the compositions may additionally contain as component C one or more polymer additives, process auxiliaries and/or polymers distinct from components A and B with the proviso that these do not stand in the way of achieving the object of the invention with regard to their nature and usage amount.

This component C is employed in the compositions in an amount of preferably up to 25% by weight, more preferably up to 10% by weight, particularly preferably up to 5% by weight and most preferably up to 1% by weight.

Such component C-containing compositions preferably consist of 35% to 95% by weight, particularly preferably 60% to 90% by weight, most preferably 75% to 85% by weight, of component A, 4.99% to 64.99% by weight, particularly preferably 9.98% to 39.98% by weight, most preferably 14.9% to 24.9% by weight, of component B, 0.01% to 10% by weight, particularly preferably 0.02% to 5% by weight, most preferably 0.1% to 1% by weight, of component C, wherein the % by weight amounts of components A to C are chosen such that they sum to 100% by weight.

Component A

Component A employed is an aromatic polycarbonate and/or an aromatic polyester carbonate. It is also possible to employ mixtures of two or more aromatic polycarbonates and/or polyester carbonates.

The polycarbonate and/or polyester carbonate of component A contains carboxy (COOH) groups, in a preferred embodiment terminal COOH groups. In a particularly preferred embodiment the COOH groups in component A are exclusively of a terminal nature.

The polycarbonate and/or polyester carbonate of component A has an acid number in the range from 0.5 to 10 mg potassium hydroxide (KOH)/g. In a preferred embodiment the acid number of the component A is 1 to 7 mg KOH/g, particularly preferably 1.3 to 5.0 mg KOH/g, most preferably 1.5 to 3.5 mg KOH/g.

The acid number is determined in dichloromethane (DCM)/ethanol as solvent according to DIN EN ISO 2114, method A, version 2002-6, by potentiometric titration with ethanolic KOH solution at room temperature. To this end the polymer to be investigated was dissolved in a concentration of 10 g/L in 50 mL of dichloromethane at room temperature. 5 mL of ethanol are added to the sample solution before the potentiometric titration with 0.1 N ethanolic KOH.

The polycarbonate and/or polyester carbonate of component A has a weight-average molecular weight $M_w$ measured by GPC (gel permeation chromatography) at room temperature in methylene chloride using a BPA polycarbonate standard of 10 000 to 40 000 g/mol, preferably of 15 000 to 35 000 g/mol, particularly preferably of 20 000 to 30 000 g/mol.

If the component A employed is a mixture of two or more polycarbonates of distinct individual acid number and/or distinct individual weight-average molecular weight $M_w$ this mixture has an acid number/a weight-average molecular weight $M_w$ in one of the abovementioned ranges.

Aromatic polycarbonates of component A which are suitable according to the invention are known from the literature or may be produced by literature processes (for production of aromatic polycarbonates see, for example, Schnell, "Chemistry and Physics of Polycarbonates", Interscience Publishers, 1964, and DE-AS 1 495 626, DE-A 2 232 877, DE-A 2 703 376, DE-A 2 714 544, DE-A 3 000 610, DE-A 3 832 396).

Aromatic polycarbonates of component A are produced for example by reaction of diphenols with carbonyl halides, preferably phosgene and/or with aromatic dicarbonyl dihalides, preferably dihalides of benzenedicarboxylic acid, by the phase interface process, preferably using chain terminators, for example monophenols, and optionally using trifunctional or more than trifunctional branching agents, for example triphenols or tetraphenols. Production via a melt polymerization process by reaction of diphenols with, for example, diphenyl carbonate in the presence of a transesterification catalyst is in principle likewise possible.

The phase interface polymerization process is particularly suitable for producing the COOH-containing polycarbonates of component A according to the invention.

A preferred process for producing terminal COOH-containing polycarbonates of component A is described in U.S. Pat. No. 4,853,458 B. Monophenols containing carboxylic acid groups or carboxylic acid group derivatives such as for example ester, anhydride or amide groups are employed as chain terminators in a phase interface polymerization process. After the polymerization a liberation of the COOH groups is effected as described below. The molecular weight of the thus-produced polycarbonates is specifically adjustable over wide ranges through variation of the ratio of the monophenolic chain terminator to diphenols. Preferably employed as chain terminators containing carboxylic acid groups or carboxylic acid group derivatives are alkyl, aryl or alkylaryl esters of 4-hydroxybenzoic acid. It is particularly preferable to employ alkyl esters of 4-hydroxybenzoic acid, more preferably the tert-butyl ester of 4-hydroxybenzoic acid, i.e. tert-butyl 4-hydroxybenzoate, as chain terminator. The chain terminators containing carboxylic acid groups or carboxylic acid group derivatives may also be employed as a mixture with other monophenolic chain terminators containing no carboxylic acid groups or carboxylic acid group derivatives, i.e. as a chain terminator mixture. The content of COOH groups in component A may be specifically adjusted over wide ranges via the ratio of the chain terminator molecules containing carboxylic acid groups or carboxylic acid group derivatives to chain terminator molecules not containing carboxylic acid groups or carboxylic acid group derivatives and via the conditions in the subsequent liberation of the COOH groups.

Examples of chain terminators containing no carboxylic acid groups or carboxylic acid group derivatives suitable for production of the aromatic polycarbonates in the phase interface process include phenol, p-chlorophenol, p-tert-butylphenol or 2,4,6-tribromophenol, and also long-chain alkylphenols such as 4-[2-(2,4,4-trimethylpentyl)]phenol, 4-(1,3-tetramethylbutyl)phenol according to DE-A 2 842 005 and monoalkylphenol or dialkylphenols having a total of from 8 to 20 carbon atoms in the alkyl substituents, for example 3,5-di-tert-butylphenol, p-isooctylphenol, p-tert-octylphenol, p-dodecylphenol and 2-(3,5-dimethylheptyl) phenol and 4-(3,5-dimethylheptyl)phenol. Preferred chain terminators of this kind are phenol or p-tert-butylphenol, most preferably p-tert-butylphenol.

It is further preferable when these chain terminators containing no carboxylic acid groups or carboxylic acid group derivatives are employed in the production of the polycarbonates in a molar proportion, based on in total 100 mol % of all chain terminators, of 20 to 90 mol %, particularly preferably 40 to 85 mol %, more preferably 45 to 80 mol %, particularly preferably 50 to 75 mol %.

The terminal COOH groups (i.e. 4-hydroxybenzoic acid end groups) may be liberated from the polycarbonates having 4-hydroxybenzoic ester end groups through end group pyrolysis or through acid-catalyzed ester cleavage for example. In the case of the preferred use of tert-butyl 4-hydroxybenzoate as chain terminators the COOH end groups may be thermally liberated from the tert-butyl 4-hydroxybenzoate end groups in the polycarbonate particularly easily through thermal elimination of isobutylene at temperatures above 200° C., preferably in the range from 230° C. to 275° C., more preferably in the range from 230° C. to 260° C., particularly preferably in the range from 230° C. to 255° C., without appreciably degenerating the polycarbonate backbone. Varying especially the temperature in this end group pyrolysis makes it possible to control the proportion of the COOH end groups and also the ratio to undesired byproducts.

Diphenols for production of the aromatic polycarbonates and/or aromatic polyester carbonates are preferably those of formula (1)

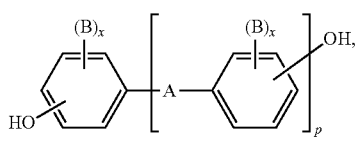

where
A is a single bond, $C_1$ to $C_5$ alkylene, $C_2$ to $C_5$ alkylidene, $C_5$ to $C_6$ cycloalkylidene, —O—, —SO—, —CO—, —S—, —SO$_2$—, $C_6$ to $C_{12}$ arylene, onto which further aromatic rings optionally containing heteroatoms may be fused,
or a radical of formula (2) or (3)

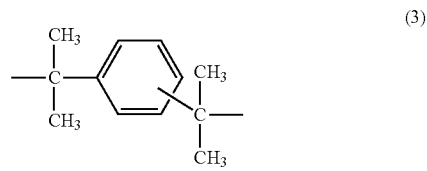

B is in each case $C_1$ to $C_{12}$ alkyl, preferably methyl, halogen, preferably chlorine and/or bromine,
x is in each case independently 0, 1 or 2,
p is 1 or 0, and
$R^5$ and $R^6$ can be selected individually for each $X^1$ and are each independently hydrogen or $C_1$ to $C_6$ alkyl, preferably hydrogen, methyl or ethyl,
$X^1$ is carbon and
m is an integer from 4 to 7, preferably 4 or 5, with the proviso that, on at least one atom $X^1$, $R^5$ and $R^6$ are both alkyl.

Preferred diphenols are hydroquinone, resorcinol, dihydroxydiphenols, bis(hydroxyphenyl)-$C_1$-$C_5$-alkanes, bis(hydroxyphenyl)-$C_5$-$C_6$-cycloalkanes, bis(hydroxyphenyl) ethers, bis(hydroxyphenyl) sulfoxides, bis(hydroxyphenyl) ketones, bis(hydroxyphenyl) sulfones and α,α-bis(hydroxyphenyl)diisopropylbenzenes and also ring-brominated and/or ring-chlorinated derivatives thereof.

Particularly preferred diphenols are 4,4'-dihydroxybiphenyl, bisphenol A, 2,4-bis(4-hydroxyphenyl)-2-methylbutane, 1,1-bis(4-hydroxyphenyl)cyclohexane, 1,1-bis(4-hydroxyphenyl)-3,3,5-trimethylcyclohexane, 4,4'-dihydroxydiphenyl sulfide, 4,4'-dihydroxydiphenyl sulfone, and also the di- and tetrabrominated or chlorinated derivatives thereof, for example 2,2-bis(3-chloro-4-hydroxyphenyl)propane, 2,2-bis(3,5-dichloro-4-hydroxyphenyl)propane or 2,2-bis(3,5-dibromo-4-hydroxyphenyl)propane. Particular preference is given to 2,2-bis(4-hydroxyphenyl) propane (bisphenol A).

The diphenols may be used individually or in the form of any desired mixtures. The diphenols are known from the literature or obtainable by literature processes.

In a preferred embodiment the proportion of bisphenol A based on the sum of all diphenols used to produce component A is at least 50 mol %, particularly preferably at least 75 mol %, most preferably at least 95 mol %. It is most preferable when exclusively bisphenol A is used as the diphenol in the production of component A.

The aromatic polycarbonates may be branched in a known manner, and preferably through incorporation of 0.01 to 2.0 mol %, based on the sum of the diphenols used, of trifunctional or more than trifunctional compounds, for example those having three or more phenolic groups.

It is preferable to employ linear aromatic polycarbonates, more preferably linear aromatic polycarbonates based on bisphenol A, particularly preferably exclusively based on bisphenol A.

Aromatic dicarbonyl dihalides for production of aromatic polyester carbonates are preferably the diacyl dichlorides of isophthalic acid, of terephthalic acid, of diphenyl ether 4,4'-dicarboxylic acid and of naphthalene-2,6-dicarboxylic acid.

Particular preference is given to mixtures of the diacid dichlorides of isophthalic acid and terephthalic acid in a ratio of between 1:20 and 20:1.

In the production of polyester carbonates, a carbonyl halide, preferably phosgene, is also additionally used as a bifunctional acid derivative.

Useful chain terminators for the production of the aromatic polyester carbonates include, apart from the monophenols already mentioned, the chlorocarbonic esters thereof and the acid chlorides of aromatic monocarboxylic acids, which may optionally be substituted by C1 to C22-alkyl groups or by halogen atoms, and aliphatic C2 to C22-monocarbonyl chlorides.

The production of aromatic polyester carbonates may additionally employ one or more aromatic hydrocarboxylic acids.

The aromatic polyester carbonates may be either linear or else branched in a known manner (see DE-A 2 940 024 and DE-A 3 007 934), wherein linear polyester carbonates are preferred.

Branching agents that may be used are for example tri- or polyfunctional carbonyl chlorides, such as trimesoyl trichloride, cyanuroyl trichloride, 3,3',4,4'-benzophenonetetracarbonyl tetrachloride, 1,4,5,8-naphthalenetetracarbonyl tetrachloride or pyromellitoyl tetrachloride, in amounts of 0.01 to 2.0 mol % based on the dicarbonyl dichlorides employed or tri- or polyfunctional phenols, such as phloroglucinol, 4,6-dimethyl-2,4,6-tri(4-hydroxyphenyl)hept-2-ene, 4,6-dimethyl-2,4,6-tri(4-hydroxyphenyl)heptane, 1,3,5-tri(4-hydroxyphenyl)benzene, 1,1,1-tri(4-hydroxyphenyl)ethane, tri(4-hydroxyphenyl)phenyl-methane, 2,2-bis[4,4-bis(4-hydroxyphenyl)cyclohexyl]propane, 2,4-bis(4-hydroxyphenylisopropyl)-phenol, tetra(4-hydroxyphenyl) methane, 2,6-bis(2-hydroxy-5-methylbenzyl)-4-methylphenol, 2-(4-hydroxyphenyl)-2-(2,4-dihydroxyphenyl)propane, tetra(4-[4-hydroxyphenylisopropyl]phenoxy)-methane, 1,4-bis[4,4'-dihydroxytriphenyl)methyl]benzene, in amounts of 0.01 to 2.0 mol % based on the diphenols employed. Phenolic branching agents may be initially charged together with the diphenols; acid chloride branching agents may be introduced together with the acid dichlorides.

The proportion of carbonate structural units in the thermoplastic aromatic polyester carbonates may be varied as desired. The proportion of carbonate groups is preferably up to 100 mol %, in particular up to 80 mol %, particularly preferably up to 50 mol %, based on the sum of ester groups and carbonate groups. Both the ester fraction and the carbonate fraction of the aromatic polyester carbonates may be present in the form of blocks or in random distribution in the polycondensate.

It is most preferable to employ as component A exclusively linear aromatic polycarbonates, preferably based on bisphenol A, particularly preferably exclusively based on bisphenol A.

Component B

Component B is a polymethyl methacrylate copolymer containing structural units derived from glycidyl methacrylate.

Component B may also be a mixture of two or more polymethyl methacrylate copolymers. These polymethyl methacrylate copolymers may also contain proportions of polymethyl methacrylate polymer molecules which themselves contain no glycidyl methacrylate-derived structural units. This is generally unavoidable as a consequence of manufacture especially in the case of small glycidyl methacrylate contents in the polymethyl methacrylate copolymer.

The polymethyl methacrylate copolymers of component B have epoxy equivalents, determined in dichloromethane as solvent at room temperature according to DIN EN 1877-1, version 2000-12, of 0.05% to 3% by weight, preferably of 0.1% to 1.5% by weight, particularly preferably of 0.13% to 0.60% by weight, most preferably of 0.15% to 0.45% by weight.

The polymethyl methacrylate copolymers of component B have a weight-average molecular weight $M_w$, determined by gel permeation chromatography at room temperature in tetrahydrofuran as solvent using a polystyrene standard, of 20 000 to 200 000 g/mol, preferably of 30 000 to 150 000 g/mol, particularly preferably 50 000 to 100 000 g/mol.

When component B is a mixture of two or more polymethyl methacrylate copolymers the above-mentioned (preferred) ranges for the epoxy content and the weight-average molecular weights $M_w$ and all below-mentioned (preferred) ranges for the corresponding mixture of the polymethyl methacrylate copolymers of component B likewise apply.

The expression "copolymer containing structural units derived from" is to be understood as meaning that the copolymer is produced from the recited monomers by copolymerization.

Component B preferably contains 0.2% to 10% by weight, more preferably 0.3% to 5% by weight, particularly preferably 0.4% to 2% by weight, most preferably 0.5% to 1.5% by weight, of structural units derived from glycidyl methacrylate.

These copolymers are preferably produced by polymerization of methyl methacrylate in the presence of 0.2% to 10% by weight, more preferably 0.3% to 5% by weight, particularly preferably 0.4% to 2% by weight, most preferably 0.5% to 1.5% by weight, of glycidyl methacrylate.

The copolymers of component B may contain up to 50% by weight, preferably up to 25% by weight, particularly preferably up to 10% by weight, of further structural units derived from copolymerizable vinylic, preferably acrylic (i.e. acryloyl-containing), monomers. Suitable copolymerizable acrylic monomers include for example methyl acrylate, ethyl acrylate, propyl acrylate, butyl acrylate, hexyl acrylate, 2-ethylhexyl acrylate, butyl methacrylate and other compounds structurally related to these recited acrylates.

The % by weight values reported in relation to component B in this section in each case refer to component B.

In a most preferred embodiment component B contains no structural units derived from further copolymerizable vinylic monomers.

The copolymers of component B are thermoplastic.

Production of the copolymers of component B containing structural units derived from methyl methacrylate and glycidyl methacrylate is known to those skilled in the art and is preferably carried out by free-radically initiated polymerization of the corresponding monomers, in particular by emulsion, suspension, solution or bulk polymerization.

In the case of solution polymerization, which is preferably carried out in aprotic solvents, for example optionally halogen-substituted aliphatic or aromatic hydrocarbons as solvent, it is preferable to maintain conditions which at least largely avoid hydrolysis of the epoxide groups. Suitable and preferred conditions therefor are, for example, low contents of polar solvents such as water, alcohol, acids or bases, and the use of solvents from the group of the organic hydrocarbons inert toward epoxy groups, for example toluene, ethylbenzene, xylene, high-boiling aliphatics, chlorinated aromatic hydrocarbons such as mono-, di- tri- or tetrachlorobenzenes, chlorinated aliphatic hydrocarbons such as dichloromethane or chloroform, ketones such as methyl ethyl ketone, esters or ethers.

Addition of chain transfer agents, especially of sulfur chain transfer agents, in particular of mercaptans, makes it possible to adjust the molecular weights of component B in the free-radical polymerization such as to achieve the weight-average molecular weight $M_w$ according to the invention.

Component C

As component C the composition may contain one or more polymer additives, process auxiliaries and/or further polymeric components distinct from components A and B, preferably selected from the group consisting of flame retardants, anti-drip agents, flame retardant synergists, smoke inhibitors, lubricants and demolding agents, nucleating agents, polymeric and nonpolymeric antistats, conductivity additives, stabilizers (for example hydrolysis, heat aging and UV stabilizers and also transesterification inhibitors), flow promoters, phase compatibilizers, impact modifiers (either with or without a core-shell structure), polymeric blend partners, catalysts, fillers and reinforcers and dyes and pigments.

The selection of the type and amount of component C is carried out such that influences on the mechanical properties and transparency of the molded articles produced from the molding compounds are as slight as possible, i.e. the addition of component C does not stand in the way of achieving the object of the invention.

When component C is employed it is employed in an amount of not more than 25% by weight based on the composition. This proportion is then the sum of all polymer additives, process auxiliaries and polymeric components distinct from components A and B employed as component C.

Anti-drip agents, flame retardant synergists, smoke inhibitors, lubricants and demolding agents, nucleating agents, nonpolymeric antistats, conductivity additives and stabilizers are employed in each case preferably in a proportion of up to 1% by weight, particularly preferably in a proportion of 0.05% to 1% by weight, and in total preferably in a proportion of 0.05% to 3% by weight based on the composition.

When flame retardants are used it is preferable to use up to 15% by weight, particularly preferably 0.05% to 15% by weight, based on the composition.

When flow promoters, polymeric antistats and phase compatibilizers are employed the proportion employed is in each case preferably up to 10% by weight, particularly preferably 0.05% to 10% by weight, and in total preferably 0.05% to 15% by weight based on the composition When impact modifiers or polymeric blend partners are employed the employed proportion is in total preferably up to 18% by weight, particularly preferably 0.05% to 18% by weight, based on the composition.

When dyes or pigments are employed the employed proportion as a total of all employed dyes and pigments is preferably up to 10% by weight, particularly preferably 0.1% to 10% by weight, based on the composition.

In a preferred embodiment inorganic pigments are used in a total proportion of not more than 3% by weight, particularly preferably of not more than 1.5% by weight, more preferably of not more than 0.5% by weight, in each case based on the composition. In the most preferred embodiment no inorganic pigments are employed as a constituent of component C.

If fillers and reinforcing materials are employed the proportion used is preferably 3% to 10% by weight based on the composition.

In a preferred embodiment no fillers and reinforcers are employed.

In a preferred embodiment at least one polymer additive selected from the group consisting of lubricants and mold release agents, stabilizers, flow promoters, phase compatibilizers, impact modifiers, further polymeric blend partner and dyes is employed.

In a preferred embodiment pentaerythritol tetrastearate is used as a demolding agent.

In a preferred embodiment at least one representative selected from the group consisting of sterically hindered phenols, organic phosphites and sulfur-based co-stabilizers is used as a stabilizer.

In a particularly preferred embodiment at least one representative selected from the group consisting of octadecyl-3-(3,5-di-tert-butyl-4-hydroxyphenyl)propionate and tris(2,4-di-tert-butylphenyl)phosphite is used as a stabilizer.

Production of Molding Compounds and Molded Articles from the Compositions According to the Invention The compositions according to the invention may be used to produce thermoplastic molding compounds.

The thermoplastic molding compounds according to the invention may be produced, for example, by mixing the respective constituents of the compositions with one another in the melt at temperatures of 220° C. to 320° C., preferably 230° C. to 300° C., particularly preferably 240° C. to 280° C., most preferably 250° C. to 270° C.

The invention also provides a corresponding process for producing the molding compounds according to the invention.

The process comprises the steps of:
(i) melting the constituents of the composition by introducing thermal energy and/or mechanical shear,
(ii) mixing and dispersing the different components of the composition with or in each other,
(iii) solidifying the melt by cooling,
(iv) granulating the solidified polymer blend resulting from steps (i)-(iii).

The residence time of the components at the abovementioned temperatures is preferably in a range from 15 seconds to 30 minutes, more preferably 30 seconds to 20 minutes. When using extruders or continuous co-kneaders as the compounding apparatus the residence time is preferably 15 seconds to 5 minutes, particularly preferably 30 seconds to 2 minutes.

It is also possible to carry out a degassing of the present composition by application of negative pressure after step ii). The absolute pressure established is preferably not more than 400 mbar, more preferably not more than 200 mbar, particularly preferably not more than 100 mbar.

Mixing may be carried out in customary apparatuses, for example in single-screw extruders, co-rotating or counter-rotating twin-screw extruders, planetary roller extruders, internal kneaders or continuous or discontinuous co-kneaders. The compositions are melt-compounded or melt-extruded therein to form molding compounds. In the context of the present application, this process is generally referred to as compounding or melt compounding. The term "molding compound" is thus to be understood as meaning the product obtained when the constituents of the composition are melt-compounded and melt-extruded. The present invention further provides such a molding compound.

The mixing of the individual constituents of the compositions may be carried out in a known manner, either successively or simultaneously, either at about 20° C. (room temperature) or at a higher temperature. This means that, for example, some of the constituents may be introduced completely or partially via the main intake of an extruder and the remaining constituents may be introduced completely or partially later in the compounding process via a side extruder.

When performing the above-described process the epoxy groups in the glycidyl methacrylate-derived structural units in component B are partially or completely chemically reacted. This reaction can be detected and quantitatively monitored via the reduction in the epoxy equivalent determined in dichloromethane as solvent at room temperature according to DIN EN 1877-1 (version 12-2000). The reaction may alternatively be quantitatively monitored and detected by $^1$H-NMR spectroscopic analyses. The characteristic $^1$H-NMR multiplet signals of the protons in the unopened epoxy ring at 2.58-2.64 ppm, 2.80-2.84 ppm and 3.15-3.22 ppm (measured in deuterated chloroform $CD_2Cl_2$ as solvent with a 600 Mhz instrument from Bruker, Karlsruhe, Germany) whose intensity decreases with increasing conversion of the epoxy groups are used as a basis. Chemical shifts are reported relative to tetramethylsilane. Performing the above-described process preferably effects a chemical coupling of component A or a portion of component A to component B or a portion of component B to form a PC-PMMA copolymer. The COOH groups in component A generally react with the epoxy groups of component B. The copolymer from the reaction of polymers A and B is generally a block copolymer or graft copolymer containing blocks of the components A and B.

The chemical reaction of the epoxy groups in the structural units derived from glycidyl methacrylate in component B with the carboxy groups in component A to form a copolymer containing blocks of the components A and B may be monitored via the reduction in acid number, determined in DCM/ethanol as solvent by potentiometric titration with ethanolic KOH solution at room temperature, occurring simultaneously to the reduction in epoxy groups. The reaction product may be detected via $^1$H-NMR spectroscopy. NMR spectroscopy likewise allows quantitative monitoring of the chemical reaction as an alternative to the abovementioned titration methods. The formation of coupling products containing blocks of the components A and B generally leads to the appearance of a plurality of new, often very broad and poorly resolved multiplet signals in the $^1$H-NMR spectrum in the range between 4.18-4.55 ppm resulting from the addition bonding of the carboxy group of component A to the epoxy group of component B. However, due to their breadth and the generally very low concentration of the bonding groups, detection by NMR spectroscopy is not always (easily) reliably possible and often requires marked enlargement of the corresponding spectral region and acquisition of a spectrum with an excellent signal-to-noise ratio.

A further option for detecting the formation of copolymers containing blocks of the components A and B is the performance of 2D DOSY-1H-NMR analyses. Here, the formation of copolymers manifests in a reduction in the diffusion coefficient of the reaction product relative to the components in the corresponding physical polymer mixture of components A and B.

It is further preferable when the mixture containing components A, B and optionally C employed in step i) has a residual moisture content determined by Karl Fischer titration of 0.01% to 0.50% by weight, more preferably 0.07% to 0.20% by weight, in each case based on the sum of A, B and C. At excessively high moisture content there is a risk of undesirably high molecular weight degradation.

The molding compounds of the invention may be used to produce molded articles of any kind. These may be produced by injection molding, extrusion and blow molding processes for example. A further form of processing is the production of molded articles by thermoforming from previously produced sheets or films. The molding compounds according to the invention are particularly suitable for processing by extrusion, blow-molding and thermoforming methods.

It is also possible to meter the constituents of the composition directly into the conveying extruder of an injection molding machine, to thus produce the molding compound in the conveying extruder and to effect direct processing into molded articles by appropriate discharging of the molding compound into an injection mold (compounding or reactive compounding injection molding).

The present invention further provides such a process comprising the steps of:
(i) metering the constituents of the composition according to the invention into the conveying extruder of an injection molding machine,
(ii) melting the constituents of the composition according to the invention by introducing thermal energy and/or mechanical shear,
(iii) conveying the melt to the discharging point of the extruder,
(iv) discharging the melt from the conveying extruder into an injection mold,
(v) cooling and solidifying the melt in the injection molded to form a molded article,
(vi) removing the molded article from the injection mold.

In a preferred embodiment of this process the residence time of the melt in the conveying extruder is at least two minutes, more preferably at least five minutes, particularly preferably at least seven minutes.

In a preferred embodiment of this process the residence time of the melt in the conveying extruder is 2 to 30 minutes, more preferably 5 to 20 minutes, particularly preferably 7 to 15 minutes.

In a preferred embodiment, process steps (iii) and (iv) are carried out under shear. This may be achieved for example via a high screw speed during melt conveying in step (iii) and/or via a suitable screw configuration of the conveyor screw, for example through the use of kneading elements, and through a suitably narrow geometry of the melt outlet nozzle in step (iv).

The present invention thus further relates to the use of a composition according to the invention or of a molding compound according to the invention for producing molded articles and also to a molded article obtainable from a composition according to the invention or from a molding compound according to the invention or containing such a molding compound.

Examples of such molded articles are films, profiles, housing parts of any type, for example for domestic appliances such as juice presses, coffee machines, mixers; for office machinery such as monitors, flatscreens, notebooks, printers, copiers; sheets, pipes, electrical installation ducts, windows, doors and other profiles for the construction sector (internal fitout and external applications), and also electrical and electronic components such as switches, plugs and sockets, and component parts for commercial vehicles, in particular for the automobile sector. The compositions and molding compounds according to the invention are also suitable for producing the following molded articles or moldings: internal fitout parts for rail vehicles, ships, aircraft, buses and other motor vehicles, bodywork components for motor vehicles, housings of electrical equipment containing small transformers, housings for equipment for the processing and transmission of information, housings and facings for medical equipment, massage equipment and housings therefor, toy vehicles for children, sheetlike wall elements, housings for safety equipment, thermally insulated transport containers, molded parts for sanitation and bath equipment, protective grilles for ventilation openings and housings for garden equipment.

On account of their particular technical properties the compositions and molding compounds according to the invention are particularly suitable for producing molded articles transilluminable by light in the visible wavelength range, for example from an LED light source, for illumination and light guide applications in the automotive sector, in the construction sector and in the electronics sector. They are especially suitable for producing transilluminable moldings for use in automotive interiors such as for example instrument panel carriers or decorative trim pieces or in automotive body applications intended to serve for example for ambient lighting or appropriately switchable functional display functions (for example day/night differentiation).

Further embodiments of the present invention are as follows.

1. Composition containing
   A) a carboxy-containing aromatic polycarbonate and/or aromatic polyester carbonate, wherein the polycarbonate has an acid number in the range from 0.5 to 10 mg potassium hydroxide/g, determined in DCM/ethanol as solvent by potentiometric titration according to DIN EN ISO 2114, method A, version 2002-6, with ethanolic KOH solution at room temperature, and a weight-average molecular weight $M_w$, determined by gel permeation chromatography at room temperature in dichloromethane as solvent using a BPA polycarbonate standard, in the range from 10 000 to 40 000 g/mol and
   B) a polymethyl methacrylate copolymer containing structural units derived from glycidyl methacrylate, wherein the copolymer has an epoxy equivalent, determined in dichloromethane as solvent at room temperature according to DIN EN 1877-1, version 2000-12, of 0.05% to 3% by weight and a weight-average molecular weight $M_w$, determined by gel permeation chromatography at room temperature in tetrahydrofuran as solvent using a polystyrene standard, of 20 000 to 200 000 g/mol,
wherein the weight ratio of components A to component B is in the range from 95:5 to 35:65.

2. Composition according to embodiment 1, wherein the weight ratio of components A to component B is in the range from 85:15 to 75:25.

3. Composition according to any of the preceding embodiments, wherein component A contains terminal carboxy groups.

4. Composition according to any of the preceding embodiments, wherein the carboxy groups in component A are exclusively terminal carboxy groups.

5. Composition according to any of the preceding embodiments, wherein component A is produced in the phase interface polymerization process.

6. Composition according to any of the preceding embodiments, wherein the ratio of (i) the product of the acid number of component A in mg potassium hydroxide/g and the weight fraction of component A, based on in total 100 parts by weight of the components A and B, to (ii) the product of the epoxy equivalent of component B in % by weight and the weight fraction of component B, based on in total 100 parts by weight of the components A and B, is in the range from 15 to 200.

7. Composition according to any of the preceding embodiments, wherein the ratio of (i) the product of the acid number of component A in mg potassium hydroxide/g and the weight fraction of component A, based on in total 100 parts by weight of the components A and B, to (ii) the product of the epoxy equivalent of component B in % by weight and the weight fraction of component B, based on in total 100 parts by weight of the components A and B, is in the range from 20 to 100.

8. Composition according to any of the preceding embodiments, wherein the ratio of (i) the product of the acid number of component A in mg potassium hydroxide/g and the weight fraction of component A, based on in total 100 parts by weight of the components A and B, to (ii) the product of the epoxy equivalent of component B in % by weight and the weight fraction of component B, based on in total 100 parts by weight of the components A and B, is in the range from 25 to 50.

9. Composition according to any of the preceding embodiments, wherein the acid number of component A is 1 to 7 potassium hydroxide/g.

10. Composition according to any of the preceding embodiments, wherein the acid number of component A is 1.3 to 5.0 potassium hydroxide/g.

11. Composition according to any of the preceding embodiments, wherein the acid number of component A is 1.5 to 3.5 potassium hydroxide/g.

12. Composition according to any of the preceding embodiments, wherein the weight-average molecular weight $M_w$ of component A is 15 000 to 35 000 g/mol.

13. Composition according to any of the preceding embodiments, wherein the weight-average molecular weight $M_w$ of component A is 20 000 to 30 000 g/mol.

14. Composition according to any of the preceding embodiments, wherein component B has an epoxy equivalent of 0.1% to 1.5% by weight.

15. Composition according to any of the preceding embodiments, wherein component B has an epoxy equivalent of 0.13% to 0.60% by weight.

16. Composition according to any of the preceding embodiments, wherein component B has an epoxy equivalent of 0.15% to 0.45% by weight.

17. Composition according to any of the preceding embodiments, wherein component B has a weight-average molecular weight $M_w$ of 30 000 to 150 000 g/mol.

18. Composition according to any of the preceding embodiments, wherein component B has a weight-average molecular weight $M_w$ of 50 000 to 100 000 g/mol.

19. Composition according to any of the preceding embodiments, wherein component B contains 0.2% to 10% by weight of structural units derived from glycidyl methacrylate.

20. Composition according to any of the preceding embodiments, wherein component B contains 0.3% to 5% by weight of structural units derived from glycidyl methacrylate.

21. Composition according to any of the preceding embodiments, wherein component B contains 0.4% to 2% by weight of structural units derived from glycidyl methacrylate.

22. Composition according to any of the preceding embodiments, wherein component B contains 0.5% to 1.5% by weight of structural units derived from glycidyl methacrylate.

23. Composition according to any of the preceding embodiments consisting of
   35% to 95% by weight of component A,
   4.99% to 64.99% by weight of component B and
   0.01% to 10% by weight of polymer additives, process auxiliaries and/or polymers distinct from components A and B as component C,
   wherein the % by weight amounts of components A to C are chosen such that they sum to 100% by weight.

24. Composition according to embodiment 22, consisting of
   60% to 90% by weight of component A, 9.98% to 39.98% by weight of component B and 0.02% to 5% by weight of component C.

25. Composition according to embodiment 22, consisting of
   75% to 85% by weight of component A, 14.9% to 24.9% by weight of component B and 0.1% to 1% by weight of component C.

26. Process for producing a thermoplastic molding compound comprising the steps of
   (i) melting the constituents of a composition according to any of the preceding embodiments by introducing thermal energy and/or mechanical shear,
   (ii) mixing and dispersing the different components of the composition with or in each other,
   (iii) solidifying the melt by cooling,
   (iv) granulating the solidified polymer blend resulting from steps (i)-(iii),
wherein step (ii) is carried out in a compounding machine selected from the group consisting of single-screw extruders, co-rotating or counter-rotating twin-screw extruders, planetary roller extruders, internal kneaders or co-kneaders and at a temperature of the melt of 230° C. to 300° C.

27. Process according to embodiment 26, wherein in the process the epoxy groups from component B are partially or completely reacted in a chemical reaction.

28. Process according to embodiment 27, wherein in the process the epoxy groups in the structural units derived from glycidyl methacrylate in component B are partially or completely reacted in a chemical reaction with the carboxy groups in component A to form a copolymer containing blocks of the components A and B.

29. Process according to any of the embodiments 26 to 28, wherein the compounding apparatus employed is an extruder or a continuous co-kneaders and the residence time is 15 seconds to 5 minutes.

30. Process according to any of the embodiments 26 to 28, wherein the compounding apparatus employed is an extruder or a continuous co-kneaders and the residence time is 30 seconds to 2 minutes.

31. Thermoplastic molding compound obtained in a process according to any of embodiments 26 to 30.

32. Use of a thermoplastic molding compound according to embodiment 31 for producing molded articles.

33. Molded article containing a thermoplastic molding material according to embodiment 31.

34. Molded article according to embodiment 33, wherein the molded article has a scratch resistance measured as pencil hardness based on the Wolff-Wilborn method of at least 2H.

35. Molded article according to embodiment 33, wherein the molded article has a scratch resistance measured as pencil hardness based on the Wolff-Wilborn method of at least 3H.

36. Molded article according to any of embodiments 33 to 35, wherein said article is a molded article transilluminable by light in the visible wavelength range, for example from an LED light source, for illumination applications in the automotive sector, in the construction sector or in the electronics sector.

37. Molded article according to embodiment 36, wherein said article is an instrument panel carrier or a decorative trim piece or a molded article for an automotive body application and wherein the molded article is intended to serve for example for ambient lighting or appropriately switchable functional display functions (for example day/night differentiation).

38. Molded article according to any of embodiments 33 to 37, wherein the molded article has a transmittance Y(D65, 10°) measured and calculated according to DIN 5033-7, version 2014-10, or according to DIN EN ISO 11664-3, version 2013-8, of at least 50%.

39. Molded article according to any of embodiments 33 to 38, wherein the molded article has a transmittance Y(D65, 10°) measured and calculated according to DIN 5033-7, version 2014-10, or according to DIN EN ISO 11664-3, version 2013-8, of at least 65%.

40. Molded article according to any of embodiments 33 to 39, wherein the molded article has a transmittance Y(D65, 10°) measured and calculated according to DIN 5033-7, version 2014-10, or according to DIN EN ISO 11664-3, version 2013-8, of at least 75%.

41. Molded article according to any of embodiments 33 to 40, wherein for the molded article the difference between the wavelength-specific total transmittances measured on the molded article at wavelengths of 700 nm ($T_{700}$) and 400 nm ($T_{400}$) is not more than 70% of the value of its transmittance Y(D65, 10°) and wherein the corresponding wavelength-specific total transmittances are determined according to DIN 5033-7, version 2014-10, and the transmittance value Y(D65, 10°) is calculated therefrom according to DIN EN ISO 11664-3, version 2013-08, with light type D65 and the 10° observer.

42. Molded article according to any of embodiments 33 to 41, wherein for the molded article the difference between the wavelength-specific total transmittances measured on the molded article at wavelengths of 700 nm ($T_{700}$) and 400 nm ($T_{400}$) is not more than 50% of the value of its transmittance Y(D65, 10°) and wherein the corresponding wavelength-specific total transmittances are determined according to DIN 5033-7, version 2014-10, and the transmittance value Y(D65, 10°) is calculated therefrom according to DIN EN ISO 11664-3, version 2013-08, with light type D65 and the 100 observer.

43. Molded article according to any of embodiments 33 to 42, wherein for the molded article the difference between the wavelength-specific total transmittances measured on the molded article at wavelengths of 700 nm ($T_{700}$) and 400 nm ($T_{400}$) is not more than 30% of the value of its transmittance Y(D65, 10°) and wherein the corresponding wavelength-specific total transmittances are determined according to DIN 5033-7, version 2014-10, and the transmittance value Y(D65, 10°) is calculated therefrom according to DIN EN ISO 11664-3, version 2013-08, with light type D65 and the 100 observer.

44. Process for producing a molded article, comprising the steps of
 (i) metering the constituents of a composition according to any of embodiments 1 to 25 into the conveying extruder of an injection molding machine,
 (ii) melting the constituents of the composition by introducing thermal energy and/or mechanical shear,
 (iii) conveying the melt to the discharging point of the extruder,
 (iv) discharging the melt from the conveying extruder into an injection mold,
 (v) cooling and solidifying the melt in the injection molded to form a molded article,
 (vi) removing the molded article from the injection mold.

45. Process according to embodiment 44, wherein the residence time of the melt in the conveying extruder is at least 5 minutes.

46. Process according to embodiment 44, wherein the residence time of the melt in the conveying extruder is 7 to 15 minutes.

47. Process according to any of embodiments 44 to 46, wherein process steps (iii) and (iv) are carried out under shear.

EXAMPLES

Compositions
Component A1

Bisphenol A-based polycarbonate having terminal carboxy groups and having a weight-average molecular weight $M_w$ of 26 000 g/mol and a number-average molecular weight $M_n$ of 15 000 g/mol measured at room temperature in methylene chloride as solvent against a BPA polycarbonate calibration standard. The acid number of component A1 was determined as 1.7 mg KOH/g. For acid number determination the polymer to be investigated was dissolved in a concentration of 10 g/L in 50 mL of methylene chloride at room temperature. 2.5 mL of ethanol were added to the sample solution before the potentiometric titration with 0.1 N ethanolic KOH.

Production of component A1 was carried out in two steps. In step a) a precursor containing structural units derived from tert-butyl 4-hydroxybenzoate as end groups was produced and in step b) terminal carboxy groups were liberated by thermal end group pyrolysis.

a) Production of Polycarbonate Precursor (PC-1)

In a continuously operated laboratory reactor bisphenol was subjected to polycondensation reaction with phosgene in the presence of a chain terminator mixture consisting of p-tert-butylphenol and tert-butyl 4-hydroxybenzoate in a mixture of methylene chloride and chlorobenzene as solvent in the interfacial process in a continuously operated laboratory reactor.

In the context of this synthesis 72.2 g/h of gaseous phosgene were dissolved in 959 g/h of organic solvent mixture composed of 50% by weight methylene chloride and 50% by weight chlorobenzene at −7° C. The thus-produced phosgene solution was contacted with 907 g/h of a 15% by weight aqueous alkaline bisphenol A solution temperature-controlled to 30° C. To this end the alkaline bisphenol A solution was passed through a stainless steel filter having a pore size of 90 μm in the phosgene solution and thus dispersed therein. The bisphenol A solution employed 2 mol of NaOH per 1 mol of bisphenol A. The reaction mixture was reacted until complete reaction of the phosgene in a Fink HMR040 mixing pump temperature-controlled to 25° C. Thereafter, 4.11 g/h of a mixture of 50 mol % of p-tert-butylphenol and 50 mol % tert-butyl-4-hydroxybenzoate were added as chain terminator, namely in the form of a 3% by weight solution in the solvent mixture composed of 50% by weight methylene chloride and 50% by weight chlorobenzene. The thus-obtained reaction mixture was further reacted with 66.52 g/h of 32% by weight aqueous sodium hydroxide solution in a second Fink HMR040 mixing pump. Downstream thereof were two stirred tanks run in flooded mode and fitted with baffles with a 600 second residence time, each followed by a respective gear pump, said pumps serving for both conveying of the reaction mixture and for further dispersing. After the first pump, i.e. upstream of the second stirred tank, 0.679 g/h of a 10% by weight solution of N-ethylpiperidine in chlorobenzene were added as catalyst. At the end of the reaction the pH of the reaction was about 11.5. In a phase separation vessel the organic phase was separated from the aqueous phase of the biphasic reaction mixture and the organic phase was washed with a 0.1% by weight aqueous HCl solution to remove the catalyst. This was further followed by washing with demineralized water to remove the salt residues. The polymer solution washed in this way was precipitated in organic solvent and dried overnight in a vacuum oven at 120° C.

b) End Group Pyrolysis of Polycarbonate Precursor PC-1

Liberation of the COOH end groups by thermal end group pyrolysis of the polycarbonate precursor PC-1 produced according to the above-described process through elimination of the protective group in the form of isobutylene gas was carried out in a continuous Process 11 twin-screw extruder (Thermofischer Scientific, Karlsruhe, Germany) with a screw configuration having three mixing zones and a length to diameter (L/D) ratio of 40. The melt temperature was 250° C. measured via a temperature sensor installed close to the die outlet in the last barrel element of the extruder. The melt temperature resulted from introduction of mechanical energy through the kneading elements and introduction of thermal energy through the heating of the extruder barrel. The extruder barrel is divided into eight separate and independently heatable zones. The three kneading zones were in the transition between heating zones 3 and 4, in the heating zone 5 and in the transition between heating zones 6 and 7. The raw material intake is in heating zone 1. The outlet die is heatable separately. To adjust the melt temperature the barrel temperatures in the barrel zones and the outlet die were temperature-controlled as follows: The first barrel (raw material intake zone) was not heated, zone 2 was heated to a target temperature of 70° C., zone 3 was heated to a target temperature of 160° C. and zones 4 to 8 were heated to the same target temperature of 260° C. The die was likewise heated to 260° C. The extruder was operated with a throughput of about 300 g/h and at a speed of 175 min$^{-1}$. By applying a negative pressure of about 100 mbar (absolute) the isobutylene gas liberated in the extruder under these process conditions was continuously withdrawn from the extruder via a vent dome in the (seventh) heating zone. These process conditions resulted in a residence time of the polycarbonate in the extruder of about 70 s.

Component A2

Component A2 differs from component A1 merely in terms of the temperature management in process step b), i.e. in terms of the end group pyrolysis of the polycarbonate precursor PC-1. The first barrel (raw material intake zone) was not heated, zone 2 was heated to a target temperature of 70° C., zone 3 was heated to a target temperature of 190° C. and zones 4 to 8 were heated to the same target temperature of 240° C. The die was likewise heated to 240° C. The other process parameters were unchanged over the production of component A1. This resulted in a melt temperature of 231° C. measured via the temperature sensor installed close to the die outlet in the last barrel element of the extruder. Component A2 has an acid number of 3.0 mg KOH/g and the same molecular weight as component A1.

Component A3

Bisphenol A-based polycarbonate produced in the phase interface process having a weight-average molecular weight $M_w$ of 26 000 g/mol measured at room temperature in methylene chloride as solvent against a BPA polycarbonate calibration standard. Exclusively 4-tert-butylphenol was used as chain terminator in the production of component A3. The polycarbonate contains no carboxy groups.

Component B1

Random polymethyl methacrylate-glycidyl methacrylate copolymer having a content of structural units derived from glycidyl methacrylate of 1.0% by weight produced by free-radical polymerization. Component B1 has a weight-average molecular weight $M_w$ of 60 000 g/mol measured by gel permeation chromatography at room temperature in tetrahydrofuran as solvent against a polystyrene calibration standard. The epoxy equivalent of component B1 was determined as 0.32% by weight in dichloromethane at room temperature according to DIN EN 1877-1 (version 12-2000).

Component B2

Polymethyl methacrylate having a weight average molecular weight $M_w$ of 58 000 g/mol measured by gel permeation chromatography at room temperature in tetrahydrofuran as solvent against a polystyrene calibration standard. Component B2 contains no structural units derived from glycidyl methacrylate.

Component $C_1$: Tetrabutylphosphonium acetate-acetic acid complex (Sachem Inc., Austin, USA)

Production of Thermoplastic Molding Compounds

The raw materials employed for producing the thermoplastic molding compounds were employed in the compounding in the form of powders which were produced from pellets by cryomilling.

The thermoplastic PC/PMMA molding compounds composed of the compositions shown in table 1 were compounded in a Process 11 continuous twin-screw extruder (Thermofischer Scientific, Karlsruhe, Germany) having a dispersing screw configuration comprising two mixing zones at a melt temperature of 260° C., a throughput of about 300 g/h, a speed of 125 min$^1$ and an absolute pressure of 100 mbar. These conditions resulted in a residence time of about 90 seconds. After discharging through a die plate the melt strand was cooled, thus solidified and subsequently pelletized. For these compoundings powder mixtures of the components A and B were initially produced and uniformly metered into the feed zone of the twin-screw extruder via a volumetric metering device.

Production of the Test Specimens

The thermoplastic molding compounds produced from the compositions according to table 1 were used to produce round plates having a diameter of 25 mm and a thickness of 1 mm at a temperature of 260° C., a pressure of 100 bar and a total pressing time of 4 min in a Polystat 200 laboratory thermal press from Servitec Maschinenservice GmbH (Wustermark, Deutschland).

The thermoplastic molding compounds produced from the compositions according to table 1 were further used to produce rectangular plates measuring 80 mm×80 mm×1 mm and test bars measuring 80 mm×10 mm×4 mm at a melt temperature of 270° C., a mold temperature of 60° C. and an injection pressure of 2000 bar in an Arburg Allrounder 470 H 1000-170 injection molding machine from Arburg GmbH+Co KG (Loßburg, Germany).

Performance Tests

The so-called pencil hardness was determined as a measure of scratch resistance. Measurement was carried out at room temperature using a TriForcePencil Model 293 scratchtester from Erichsen GmbH & Co. KG (Hemer, Germany) according to the test specification of the instrument manufacturer based on the Wolff-Wilborn process on the injection molded test plates measuring 80 mm×80 mm×1 mm. To this end the pencils were clamped into the measuring apparatus at an angle of 450 to the test surface and pushed over the test specimen surface with a test force of 5 N. The test was commenced with the hardest pencil and the hardness was then successively reduced. The pencil hardness of the pencil whose point is the first one to no longer leave behind a noticeable scratch in this procedure is considered the parameter that characterizes the scratch resistance of the plastic surface.

The stress cracking resistance under the influence of chemicals (ESC behavior) was determined in rapeseed oil at room temperature. The time until stress cracking-induced fracture failure determined on injection molded test bars measuring 80 mm×10 mm×4 mm subjected to 2.4% external outer fiber strain by means of a clamping template while completely immersed in the rapeseed oil was determined. Measurement was performed according to DIN EN ISO 22088 (2006 version).

The transparency of the molding compounds was determined at room temperature on thermally pressed round plates having a diameter of 25 mm and a thickness of 1 mm and on injection molded rectangular plates measuring 80 mm×80 mm×1 mm. The corresponding wavelength-dependent total transmittances were determined according to DIN 5033-7 (2014). The value Y(D65, 10°) was calculated therefrom according to DIN EN ISO 11664-3 (2013) with light type D65 and the 10° observer. The wavelength-specific transmittances at wavelengths of 700 nm ($T_{700}$) and 400 nm ($T_{400}$) were also determined.

The ductility of the molding compounds was measured on thermally pressed round plates having a diameter of 25 mm and a thickness of 1 mm at room temperature in an impact test. Measurements were carried out with a drop impact tester (dropped mass 1.86 kg, support diameter 15 mm, mandrel diameter (hemispherical) 7 mm). The drop height of the dropped mass was systematically varied and the maximum fall height at which the test specimen is not penetrated was determined.

Analytical Detection of Chemical Reaction of Epoxy Groups in Component B and Block Copolymer Formation During Production of the Molding Compounds During production of the molding compounds according to the invention by compounding, the epoxy groups in component B were partially chemically reacted. This chemical reaction of the epoxy groups was monitored and detected by $^1$H-NMR spetroscopy. The characteristic $^1$H-NMR multiplet signals of the protons in the unopened epoxy ring at 2.58-2.64 ppm, 2.80-2.84 ppm and 3.15-3.22 ppm (measured at room temperature in deuterated chloroform $CD_2Cl_2$ as solvent with a 600 Mhz instrument from Bruker, Karlsruhe, Germany) were used as a basis. The intensity thereof decreased relative to the physical mixture of the starting components during production of the molding compounds according to the invention by compounding. This reaction simultaneously formed in the $^1$H-NMR-spectrum a plurality of new, very broad and comparatively poorly resolved multiplet signals in the range between 4.18-4.55 ppm which are attributed to the bonding group formed by nucleophilic addition of carboxy groups of component A to epoxy groups of component B. The occurrence of these new signals thus shows that copolymer containing blocks of the components A and B has been formed through the chemical reaction of the epoxy groups in component B.

A comparison of inventive examples 3 to 6 shows that higher contents of component A are preferred.

A comparison of inventive examples 2 and 4 and 1 and 3 shows that higher ratios of (i) the product of the acid number of component A (in mg potassium hydroxide (KOH)/g) and the weight fraction of component A, based on in total 100 parts by weight of the components A and B, to (ii) the

TABLE 1

Compositions and properties of molding compounds produced therefrom

|  | 1 | 2 | 3 | 4 | 5 | 6 | V7 | V8 | V9 | V10 |
|---|---|---|---|---|---|---|---|---|---|---|
| Composition (parts by weight) | | | | | | | | | | |
| A1 | 80 | 70 | | | | | | | | |
| A2 | | | 80 | 70 | 62 | 40 | 30 | | | |
| A3 | | | | | | | | 80 | 80 | 100 |
| B1 | 20 | 30 | 20 | 30 | 38 | 60 | 70 | | | |
| B2 | | | | | | | | 20 | 20 | |
| C1 | | | | | | | | | 0.05 | |
| Features | | | | | | | | | | |
| Acid number of component A [mg KOH/g] | 1.7 | 1.7 | 3.0 | 3.0 | 3.0 | 3.0 | 3.0 | 0 | 0 | 0 |
| Epoxy equivalent of component B [% by weight] | 0.32 | 0.32 | 0.32 | 0.32 | 0.32 | 0.32 | 0.32 | 0 | 0 | — |
| (proportion (A) × AN (A))/ (proportion (B) × epoxy equivalent (B)) | 21 | 12 | 38 | 22 | 15 | 6 | 4 | — | — | — |
| Properties | | | | | | | | | | |
| Transmittance Y(D 65, 10°) (pressed molded article) | 82 | 44 | 83 | 67 | 71 | 46 | 30 | 22 | 32 | 90 |
| Transmittance Y(D 65, 10°) (injection molded article) | | | 89 | | | | | | | |
| $T_{400}$ (pressed molded article) | 65 | 17 | 68 | 37 | 42 | 16 | 14 | 16 | 22 | 88 |
| $T_{700}$ (pressed molded article) | 87 | 70 | 87 | 80 | 82 | 71 | 49 | 25 | 39 | 91 |
| 100 × $(T_{700} - T_{400})$/Y(D 65, 10°) (pressed molded article) | 27 | 120 | 24 | 64 | 56 | 120 | 117 | 41 | 53 | 3 |
| $T_{400}$ (injection molded article) | | | 87 | | | | | | | |
| $T_{700}$ (injection molded article) | | | 90 | | | | | | | |
| 100 × $(T_{700} - T_{400})$/Y(D 65, 10°) (injection molded article) | | | 3 | | | | | | | |
| Pencil hardness | | | 3H-4H | | | | | 2H | | F |
| ESC (time until fracture in rapeseed oil at 2.4%) [h] | | | >168 | | | | | 0.4 | | 2.7 |
| Ductility - test specimen not penetrated up to height of [cm] | 16 | 15 | 20 | | | | | 16 | <1 | 25 |

The data in table 1 show that molded articles produced from the inventive compositions 1 to 6 exhibit a markedly better transmittance (transparency) than molded articles produced from compositions containing non-reactively modified PC and PMMA components (V8). Compared to V8, the inventive composition 3 also shows a markedly elevated pencil hardness and a substantially improved chemicals resistance at identical proportions of components A and B. The pencil hardness and chemicals resistance of the inventive composition 3 are likewise considerably better than for pure polycarbonate (V10).

The transparency of the inventive compositions 1 and 3 is likewise improved compared to a reactively compounded composition having identical proportions of components A and B containing non-reactively modified polycarbonate, non-reactively modified PMMA and a transesterification catalyst, such as is disclosed in WO 2020/212229 A1 (V9). Ductility is moreover considerably higher for inventive compositions 1 and 3 than for V9.

A comparison of inventive examples 3 to 6 with comparative example V7 shows that the desired transilluminability (transmittance) is no longer achieved at a content of component A of 30% by weight.

product of the epoxy equivalent of component B (in % by weight) and the weight fraction of component B, based on in total 100 parts by weight of the components A and B, i.e. (proportion (A)×SZ (A))/(proportion (B)×epoxy equivalent (B)), are preferred. This applies all the more the lower the content of component A in the composition (cf. examples 2 and 4 with 1 and 3).

In the most preferred example 3 the transmittance, in particular the transmittance of injection molded moldings, is particularly uniform over the entire wavelength range of visible light, as is apparent from the lowest value for 100×$(T_{700}-T_{400})$/Y(D65,10°) of all examples. This most preferred example 3 also has a particularly high ductility.

The invention claimed is:

1. Composition containing
A) a carboxy-containing aromatic polycarbonate and/or aromatic polyester carbonate, wherein the polycarbonate has an acid number in the range from 0.5 to 10 mg potassium hydroxide/g, determined in dichloromethane/ethanol as solvent by potentiometric titration according to DIN EN ISO 2114, method A, version 2002-06, with ethanolic potassium hydroxide solution at room temperature, and a weight-average molecular weight $M_w$, determined by gel permeation chromatography at room temperature in dichloromethane as solvent using a BPA polycarbonate standard, in the range from 10 000 to 40 000 g/mol and B) a polymethyl methacrylate copolymer containing structural units derived from glycidyl methacrylate, wherein the copolymer has an epoxy equivalent, determined in dichloromethane as solvent at room temperature according to DIN EN 1877-1, version 2000-12, of 0.05% to 3% by weight and a weight-average molecular weight $M_w$, determined by gel permeation chromatography at room temperature in tetrahydrofuran as solvent using a polystyrene standard, of 20 000 to 200 000 g/mol, wherein the weight ratio of components A to component B is in the range from 95:5 to 35:65.

2. Composition according to claim 1, wherein the carboxy groups in component A are exclusively terminal carboxy groups.

3. Composition according to claim 1, wherein the ratio of (i) the product of the acid number of component A in mg potassium hydroxide/g and the weight fraction of component A, based on in total 100 parts by weight of the components A and B, to (ii) the product of the epoxy equivalent of component B in % by weight and the weight fraction of component B, based on in total 100 parts by weight of the components A and B, is in the range from 15 to 200.

4. Composition according to claim 1, wherein the acid number of component A is 1.3 to 5.0 potassium hydroxide/g.

5. Composition according to claim 1, wherein the weight-average molecular weight $M_w$ of component A is 20 000 to 30 000 g/mol.

6. Composition according to claim 1, wherein component B has an epoxy equivalent of 0.13% to 0.60% by weight.

7. Composition according to claim 1, wherein component B has a weight-average molecular weight $M_w$ of 50 000 to 100 000 g/mol.

8. Composition according to claim 1, wherein component B contains 0.4% to 2% by weight of structural units derived from glycidyl methacrylate.

9. Composition according to claim 1 consisting of
35% to 95% by weight of component A,
4.99% to 64.99% by weight of component B and
0.01% to 10% by weight of polymer additives, process auxiliaries and/or polymers distinct from components A and B as component C,
wherein the % by weight amounts of components A to C are chosen such that they sum to 100% by weight.

10. Process for producing a thermoplastic molding compound comprising the steps of
(i) ting the constituents of a composition according to claim 1 by introducing thermal energy and/or mechanical shear,
(ii) mixing and dispersing the different components of the composition with or in each other,
(iii) solidifying the melt by cooling,
(iv) granulating the solidified polymer blend resulting from steps (i)-(iii),
wherein step (ii) is carried out in a compounding machine selected from the group consisting of single-screw extruders, co-rotating or counter-rotating twin-screw extruders, planetary roller extruders, internal kneaders or co-kneaders and at a temperature of the melt of 230° C. to 300° C.

11. Process according to claim 10, wherein in the process the epoxy groups in the structural units derived from glycidyl methacrylate in component B are partially or completely reacted in a chemical reaction.

12. Thermoplastic molding compound obtained in the process to claim 10.

13. Molded article containing a thermoplastic molding compound according to claim 12.

14. Process for producing a molded article, comprising the steps of
(i) metering the constituents of a composition according to claim 1 into the conveying extruder of an injection molding machine,
(ii) melting the constituents of the composition by introducing thermal energy and/or mechanical shear,
(iii) conveying the melt to the discharging point of the extruder,
(iv) discharging the melt from the conveying extruder into an injection mold,
(v) cooling and solidifying the melt in the injection molded to form a molded article,
(vi) removing the molded article from the injection mold.

15. Composition containing
A) a carboxy-containing aromatic polycarbonate and/or aromatic polyester carbonate, wherein the polycarbonate has an acid number in the range from 0.5 to 10 mg potassium hydroxide/g, determined in dichloromethane/ethanol as solvent by potentiometric titration according to DIN EN ISO 2114, method A, version 2002-06, with ethanolic potassium hydroxide solution at room temperature, and a weight-average molecular weight $M_w$, determined by gel permeation chromatography at room temperature in dichloromethane as solvent using a BPA polycarbonate standard, in the range from 10 000 to 40 000 g/mol and B) a polymethyl methacrylate copolymer containing structural units derived from glycidyl methacrylate, wherein the copolymer has an epoxy equivalent, determined in dichloromethane as solvent at room temperature according to DIN EN 1877-1, version 2000-12, of 0.05% to 3% by weight and a weight-average molecular weight $M_w$, determined by gel permeation chromatography at room temperature in tetrahydrofuran as solvent using a polystyrene standard, of 20 000 to 200 000 g/mol, wherein the weight ratio of components A to component B is in the range from 95:5 to 35:65, and wherein the ratio of (i) the product of the acid number of component A in mg potassium hydroxide/g and the weight fraction of component A, based on in total 100 parts by weight of the components A and B, to (ii) the product of the epoxy equivalent of component B in % by weight and the weight fraction of component B, based on in total 100 parts by weight of the components A and B, is in the range from 15 to 100.

16. Composition according to claim 15, wherein the acid number of component A is 1.5 to 3.5 potassium hydroxide/g.

17. Composition according to claim 15, wherein the copolymer B has an epoxy equivalent, determined in dichloromethane as solvent at room temperature according to DIN EN 1877-1, version 2000-12, of 0.13% to 0.6% by weight.

* * * * *